United States Patent
Kim (10) Patent No.: US 7,391,493 B2
(45) Date of Patent: Jun. 24, 2008

(54) LIQUID CRYSTAL DISPLAY DEVICE HAVING COLUMN SPACERS AND METHOD OF FABRICATING THE SAME

(75) Inventor: Jong Woo Kim, Kyongsangbuk-do (KR)

(73) Assignee: LG Display LCD Co., Ltd., Seoul (KR)

( * ) Notice: Subject to any disclaimer, the term of this patent is extended or adjusted under 35 U.S.C. 154(b) by 0 days.

(21) Appl. No.: 10/316,897

(22) Filed: Dec. 12, 2002

(65) Prior Publication Data

US 2003/0112404 A1 Jun. 19, 2003

(30) Foreign Application Priority Data

Dec. 14, 2001 (KR) ............... 10-2001-0079577

(51) Int. Cl.
  *G02F 1/1335* (2006.01)
  *G02F 1/1339* (2006.01)
(52) U.S. Cl. .............. 349/155; 349/106; 349/153; 349/190
(58) Field of Classification Search ........... 349/153, 349/155, 190, 106
  See application file for complete search history.

(56) References Cited

U.S. PATENT DOCUMENTS

| | | | |
|---|---|---|---|
| 3,978,580 A | 9/1976 | Leupp et al. | |
| 4,094,058 A | 6/1978 | Yasutake et al. | |
| 4,341,445 A * | 7/1982 | Matsuyama et al. | 349/123 |
| 4,653,864 A | 3/1987 | Baron et al. | |
| 4,691,995 A | 9/1987 | Yamazaki et al. | |
| 4,775,225 A | 10/1988 | Tsuboyama et al. | |
| 5,247,377 A | 9/1993 | Omeis | |
| 5,263,888 A | 11/1993 | Ishihara et al. | |
| 5,379,139 A | 1/1995 | Sato et al. | |
| 5,387,445 A * | 2/1995 | Horiuchi et al. | 428/1.54 |
| 5,406,989 A | 4/1995 | Abe | |
| 5,499,128 A | 3/1996 | Hasegawa et al. | |
| 5,507,323 A | 4/1996 | Abe | |
| 5,511,591 A | 4/1996 | Abe | |
| 5,539,545 A | 7/1996 | Shimizu et al. | |
| 5,548,429 A | 8/1996 | Tsujita | |
| 5,642,214 A | 6/1997 | Ishii | |
| 5,680,189 A | 10/1997 | Shimizu et al. | |
| 5,742,370 A | 4/1998 | Kim | |
| 5,757,451 A | 5/1998 | Miyazaki et al. | |
| 5,777,713 A * | 7/1998 | Kimura | 349/156 |
| 5,831,710 A * | 11/1998 | Colgan et al. | 349/156 |
| 5,852,484 A | 12/1998 | Inoue et al. | |
| 5,854,664 A | 12/1998 | Inoue et al. | |

(Continued)

FOREIGN PATENT DOCUMENTS

EP  1 003 066 A1  5/2000

(Continued)

*Primary Examiner*—Huyen Ngo
(74) *Attorney, Agent, or Firm*—McKenna, Long & Aldridge LLP (57) ABSTRACT

A liquid crystal display device and a method of fabricating the same are disclosed in the present invention. The liquid crystal display device includes first and second substrates facing into each other, a sealant outside a liquid crystal display panel region between the first and second substrates, a first column spacer surrounded by the sealant, and a liquid crystal layer between the first and second substrates.

8 Claims, 7 Drawing Sheets

U.S. PATENT DOCUMENTS

| | | | |
|---|---|---|---|
| 5,861,932 A | 1/1999 | Inata et al. | |
| 5,875,922 A | 3/1999 | Chastine | |
| 5,952,676 A | 9/1999 | Sato et al. | |
| 5,956,112 A | 9/1999 | Fujimori et al. | |
| 5,973,763 A * | 10/1999 | Fujimura et al. | 349/156 |
| 6,001,203 A | 12/1999 | Yamada et al. | |
| 6,011,609 A | 1/2000 | Kato | |
| 6,016,178 A | 1/2000 | Kataoka | |
| 6,016,181 A * | 1/2000 | Shimada | 349/156 |
| 6,055,035 A | 4/2000 | Von Gutfeld | |
| 6,124,917 A * | 9/2000 | Fujioka et al. | 349/153 |
| 6,163,357 A | 12/2000 | Nakamura | |
| 6,219,126 B1 | 4/2001 | Von Gutfeld | |
| 6,226,067 B1 | 5/2001 | Nishiguchi | |
| 6,236,445 B1 | 5/2001 | Foschaar et al. | |
| 6,304,306 B1 | 10/2001 | Shiomi | |
| 6,304,311 B1 | 10/2001 | Egami | |
| 6,337,730 B1 | 1/2002 | Ozaki et al. | |
| 6,404,479 B2 * | 6/2002 | Zhang et al. | 349/152 |
| 6,414,733 B1 | 7/2002 | Ishikawa | |
| 6,642,992 B2 * | 11/2003 | Kim | 349/191 |
| 6,646,709 B2 * | 11/2003 | Matsumoto | 349/156 |
| 6,683,670 B2 * | 1/2004 | Chung et al. | 349/153 |
| 6,740,190 B2 * | 5/2004 | Takase | 156/267 |
| 6,798,482 B2 * | 9/2004 | Seo et al. | 349/141 |
| 2001/0013919 A1 * | 8/2001 | Sato et al. | 349/153 |
| 2002/0015031 A1 * | 2/2002 | Fujita et al. | 345/204 |

FOREIGN PATENT DOCUMENTS

| | | |
|---|---|---|
| JP | 51-65656 | 6/1976 |
| JP | 57-038414 | 3/1982 |
| JP | 57-38414 | 3/1982 |
| JP | 57-088428 | 6/1982 |
| JP | 57-88428 | 6/1982 |
| JP | 58-027126 | 2/1983 |
| JP | 58-27126 | 2/1983 |
| JP | 58105123 A * | 6/1983 |
| JP | 59-057221 | 4/1984 |
| JP | 59-195222 | 11/1984 |
| JP | 60-111221 | 6/1985 |
| JP | 60-164723 | 8/1985 |
| JP | 60-217343 | 10/1985 |
| JP | 61-007822 | 1/1986 |
| JP | 61-7822 | 1/1986 |
| JP | 61-55625 | 3/1986 |
| JP | 61-055625 | 3/1986 |
| JP | S62-054225 | 3/1987 |
| JP | S62-054228 | 3/1987 |
| JP | S62-054229 | 3/1987 |
| JP | 62-89025 | 4/1987 |
| JP | 62-089025 | 4/1987 |
| JP | 62-90622 | 4/1987 |
| JP | 62-090622 | 4/1987 |
| JP | 62-205319 | 9/1987 |
| JP | 63-109413 | 5/1988 |
| JP | 63-110425 | 5/1988 |
| JP | 63-128315 | 5/1988 |
| JP | 63-311233 | 12/1988 |
| JP | H03-009549 | 1/1991 |
| JP | H05-036425 | 2/1993 |
| JP | H05-036426 | 2/1993 |
| JP | H05-107533 | 4/1993 |
| JP | 05-127179 | 5/1993 |
| JP | 5-127179 | 5/1993 |
| JP | 05-154923 | 6/1993 |
| JP | 5-265011 | 10/1993 |
| JP | 05-265011 | 10/1993 |
| JP | 5-281557 | 10/1993 |
| JP | 05-281557 | 10/1993 |
| JP | 5-281562 | 10/1993 |
| JP | 05-281562 | 10/1993 |
| JP | 10-333157 | 12/1993 |
| JP | 10-333159 | 12/1993 |
| JP | H06-018829 | 1/1994 |
| JP | 6-51256 | 2/1994 |
| JP | 06-051256 | 2/1994 |
| JP | H06-064229 | 3/1994 |
| JP | 6-148657 | 5/1994 |
| JP | 06-148657 | 5/1994 |
| JP | 6-160871 | 6/1994 |
| JP | 06-160871 | 6/1994 |
| JP | H06-194637 | 7/1994 |
| JP | 6-235925 | 8/1994 |
| JP | 06-235925 | 8/1994 |
| JP | 06-265915 | 9/1994 |
| JP | 6-265915 | 9/1994 |
| JP | 06-313870 | 11/1994 |
| JP | 07-084268 | 3/1995 |
| JP | 07-128674 | 5/1995 |
| JP | 7-128674 | 5/1995 |
| JP | 7-181507 | 7/1995 |
| JP | 07-181507 | 7/1995 |
| JP | H07-275770 | 10/1995 |
| JP | H07-275771 | 10/1995 |
| JP | H08-076133 | 3/1996 |
| JP | 08-095066 | 4/1996 |
| JP | 8-95066 | 4/1996 |
| JP | 8-101395 | 4/1996 |
| JP | 08-101395 | 4/1996 |
| JP | 08-106101 | 4/1996 |
| JP | 8-106101 | 4/1996 |
| JP | H08-110504 | 4/1996 |
| JP | H08-136937 | 5/1996 |
| JP | 8-171094 | 7/1996 |
| JP | 08-171094 | 7/1996 |
| JP | 8-190099 | 7/1996 |
| JP | 08-190099 | 7/1996 |
| JP | H08-173874 | 7/1996 |
| JP | 08-240807 | 9/1996 |
| JP | 8-240807 | 9/1996 |
| JP | 09-005762 | 1/1997 |
| JP | 9-5762 | 1/1997 |
| JP | 09-026578 | 1/1997 |
| JP | 9-26578 | 1/1997 |
| JP | H09-001026 | 1/1997 |
| JP | 09-311340 | 2/1997 |
| JP | 9-61829 | 3/1997 |
| JP | 09-61829 | 3/1997 |
| JP | 9-73075 | 3/1997 |
| JP | 09-073075 | 3/1997 |
| JP | 09-073096 | 3/1997 |
| JP | 9-73096 | 3/1997 |
| JP | H09-094500 | 4/1997 |
| JP | 09-127528 | 5/1997 |
| JP | 9-127528 | 5/1997 |
| JP | 09-230357 | 9/1997 |
| JP | 9-230357 | 9/1997 |
| JP | 9-281511 | 10/1997 |
| JP | 09-281511 | 10/1997 |
| JP | 9-311340 | 12/1997 |
| JP | 10-123537 | 5/1998 |
| JP | 10-123538 | 5/1998 |
| JP | 10-142616 | 5/1998 |
| JP | 10-177178 | 6/1998 |
| JP | H10-174924 | 6/1998 |
| JP | 10-221700 | 8/1998 |
| JP | 10-282512 | 10/1998 |
| JP | 10-333157 | 12/1998 |
| JP | 10-333159 | 12/1998 |
| JP | 11-14953 | 1/1999 |
| JP | 11-014953 | 1/1999 |
| JP | 11-38424 | 2/1999 |
| JP | 11-038424 | 2/1999 |

| | | |
|---|---|---|
| JP | 11-64811 | 3/1999 |
| JP | 11-064811 | 3/1999 |
| JP | 11-109388 | 4/1999 |
| JP | 11-133438 | 5/1999 |
| JP | 11-142864 | 5/1999 |
| JP | 11-174477 | 7/1999 |
| JP | 11-212045 | 8/1999 |
| JP | 11-248930 | 9/1999 |
| JP | H11-262712 | 9/1999 |
| JP | H11-264991 | 9/1999 |
| JP | 11-326922 | 11/1999 |
| JP | 11-344714 | 12/1999 |
| JP | 2000-002879 | 1/2000 |
| JP | 2000-029035 | 1/2000 |
| JP | 2000-29035 | 1/2000 |
| JP | 2000-056311 | 2/2000 |
| JP | 2000-066165 | 3/2000 |
| JP | 2000-066218 | 3/2000 |
| JP | 2000-093866 | 4/2000 |
| JP | 2000-137235 | 5/2000 |
| JP | 2000-147528 | 5/2000 |
| JP | 2000-193988 | 7/2000 |
| JP | 2000-241824 | 9/2000 |
| JP | 2000-284295 | 10/2000 |
| JP | 2000-292799 | 10/2000 |
| JP | 2000-310759 | 11/2000 |
| JP | 2000-310784 | 11/2000 |
| JP | 2000-338501 | 12/2000 |
| JP | 2001-005401 | 1/2001 |
| JP | 2001-005405 | 1/2001 |
| JP | 2001-013506 | 1/2001 |
| JP | 2001-033793 | 2/2001 |
| JP | 2001-042341 | 2/2001 |
| JP | 2001-051284 | 2/2001 |
| JP | 2001-066615 | 3/2001 |
| JP | 2001-091727 | 4/2001 |
| JP | 2001-117105 | 4/2001 |
| JP | 2001-117109 | 4/2001 |
| JP | 2001-133745 | 5/2001 |
| JP | 2001-133794 | 5/2001 |
| JP | 2001-133799 | 5/2001 |
| JP | 2001-142074 | 5/2001 |
| JP | 2001-147437 | 5/2001 |
| JP | 2001-154211 | 6/2001 |
| JP | 2001-166272 | 6/2001 |
| JP | 2001-166310 | 6/2001 |
| JP | 2001-183683 | 7/2001 |
| JP | 2001-201750 | 7/2001 |
| JP | 2001-209052 | 8/2001 |
| JP | 2001-209056 | 8/2001 |
| JP | 2001-209057 | 8/2001 |
| JP | 2001-209058 | 8/2001 |
| JP | 2001-209060 | 8/2001 |
| JP | 2001-215459 | 8/2001 |
| JP | 2001-222017 | 8/2001 |
| JP | 2001-235758 | 8/2001 |
| JP | 2001-255542 | 9/2001 |
| JP | 2001-264782 | 9/2001 |
| JP | 2001-272640 | 10/2001 |
| JP | 2001-281675 | 10/2001 |
| JP | 2001-281678 | 10/2001 |
| JP | 2001-282126 | 10/2001 |
| JP | 2001-305563 | 10/2001 |
| JP | 2001-330837 | 11/2001 |
| JP | 2001-330840 | 11/2001 |
| JP | 2001-356353 | 12/2001 |
| JP | 2001-356354 | 12/2001 |
| JP | 2002-14360 | 1/2002 |
| JP | 2002-014360 | 1/2002 |
| JP | 2002-23176 | 1/2002 |
| JP | 2002-023176 | 1/2002 |
| JP | 2002-49045 | 2/2002 |
| JP | 2002-049045 | 2/2002 |
| JP | 2002-079160 | 3/2002 |
| JP | 2002-080321 | 3/2002 |
| JP | 2002-82340 | 3/2002 |
| JP | 2002-082340 | 3/2002 |
| JP | 2002-90759 | 3/2002 |
| JP | 2002-090759 | 3/2002 |
| JP | 2002-90760 | 3/2002 |
| JP | 2002-090760 | 3/2002 |
| JP | 2002-107740 | 4/2002 |
| JP | 2002-122870 | 4/2002 |
| JP | 2002-122872 | 4/2002 |
| JP | 2002-122873 | 4/2002 |
| JP | 2002-131762 | 5/2002 |
| JP | 2002-139734 | 5/2002 |
| JP | 2002-156518 | 5/2002 |
| JP | 2002-169166 | 6/2002 |
| JP | 2002-169167 | 6/2002 |
| JP | 2002-182222 | 6/2002 |
| JP | 2002-202512 | 7/2002 |
| JP | 2002-202514 | 7/2002 |
| JP | 2002-214626 | 7/2002 |
| JP | 2002-229042 | 8/2002 |
| JP | 2002-236276 | 8/2002 |
| JP | 2002-258299 | 8/2002 |
| JP | 2002-236292 | 9/2002 |
| JP | 2002-277865 | 9/2002 |
| JP | 2002-277866 | 9/2002 |
| JP | 2002-277881 | 9/2002 |
| JP | 2002-287156 | 10/2002 |
| JP | 2002-296605 | 10/2002 |
| JP | 2002-311438 | 10/2002 |
| JP | 2002-311440 | 10/2002 |
| JP | 2002-311442 | 10/2002 |
| JP | 2002-323687 | 11/2002 |
| JP | 2002-323694 | 11/2002 |
| JP | 2002-333628 | 11/2002 |
| JP | 2002-333635 | 11/2002 |
| JP | 2002-333843 | 11/2002 |
| JP | 2002-341329 | 11/2002 |
| JP | 2002-341355 | 11/2002 |
| JP | 2002-341356 | 11/2002 |
| JP | 2002-341357 | 11/2002 |
| JP | 2002-341358 | 11/2002 |
| JP | 2002-341359 | 11/2002 |
| JP | 2002-341362 | 11/2002 |
| KR | 10-0232905 | 9/1999 |
| KR | 2000-0035302 | 6/2000 |

* cited by examiner

UV irradiation

LIQUID CRYSTAL DISPLAY DEVICE HAVING COLUMN SPACERS AND METHOD OF FABRICATING THE SAME

This application claims the benefit of the Korean Patent Application No. P2001-079577 filed on Dec. 14, 2001, which is hereby incorporated by reference.

BACKGROUND OF THE INVENTION

1. Field of the Invention

The present invention relates to a display device, and more particularly, to a liquid crystal display device and a method of fabricating the same. Although the present invention is suitable for a wide scope of applications, it is particularly suitable for forming a liquid crystal display panel device having a uniform cell gap.

2. Discussion of the Related Art

A liquid crystal display device has characteristics of full color realization, low voltage operation, low power consumption, thinness, lightness in weight, and high image quality. Thus, its applications have been diversified from monitors for electronic watches, calculators, notebook computers, personal computers and TV, and gauge monitors for aviation, personal digital assistants (PDA), and mobile stations.

In fabricating the liquid crystal display device, it is necessary to form a liquid crystal layer between lower and upper substrates. A method for forming the liquid crystal layer is largely classified into two methods, such as a liquid crystal injection method and a dispensing method. In case of a small sized panel, the liquid crystal layer is formed by injecting liquid crystals between the lower and upper substrates in a vacuum condition through an injection inlet after bonding the lower and upper substrates to each other. If a size of the panel is large, such a vacuum injection method has a problem in that it takes a long time to inject the liquid crystal. Accordingly, in case of a large sized panel, the liquid crystal is dispensed on one of the lower and upper substrates, and then the substrates are bonded to each other to form the liquid crystal layer.

In addition, spacers are used for maintaining a uniform cell gap between the lower and upper substrates. There are two kinds of spacers: the one is a ball spacer being scattered on the substrate, and the other is a column spacer being attached to the substrate. With a trend of the large sized panel, the column spacer has been mostly used since the ball spacer has limitations in maintaining a uniform cell gap in the large sized panel. At this time, materials for maintaining the uniform cell gap are used for a sealant for bonding the substrates to each other as well as for the substrates. The materials may be made of a glass fiber of which thickness maintains the cell gap between the lower and upper substrates.

After bonding the lower and upper substrates to each other, the sealant is hardened so as to fix the bonded state of the substrates. At this time, the sealant is classified into a thermo-hardening sealant being hardened by heat and a photo-hardening sealant being hardened by UV-ray. A seal mixture of an epoxy resin and a hardener is usually used as a thermo-hardening sealant. If a thermal process is performed to the seal mixture, the hardener is chemically combined with the epoxy resin, and the epoxy resin activated by the hardener is chemically combined with another epoxy resin. Accordingly, the seal mixture is polymerized so that adhesion of the seal mixture is improved.

After forming the liquid crystal layer between the lower and upper substrates, the bonded substrates are treated in a press for one to two hours so as to completely bond the lower and upper substrates to each other. The photo-hardening sealant is a seal mixture of a hardener and acrylate resin such as epoxy acrylate resin or urethane acrylate resin. If UV-ray is irradiated to the sealant, the hardener becomes a radical, and then the radical acts with the acrylate resin, so that the acrylate resin is activated. Accordingly, the seal mixture is polymerized so that the adhesion of the seal mixture is improved. After forming the liquid crystal layer between the lower and upper substrates, the UV-ray is irradiated to the bonded substrates so as to harden the sealant between the lower and upper substrates for several seconds.

Figure 1:
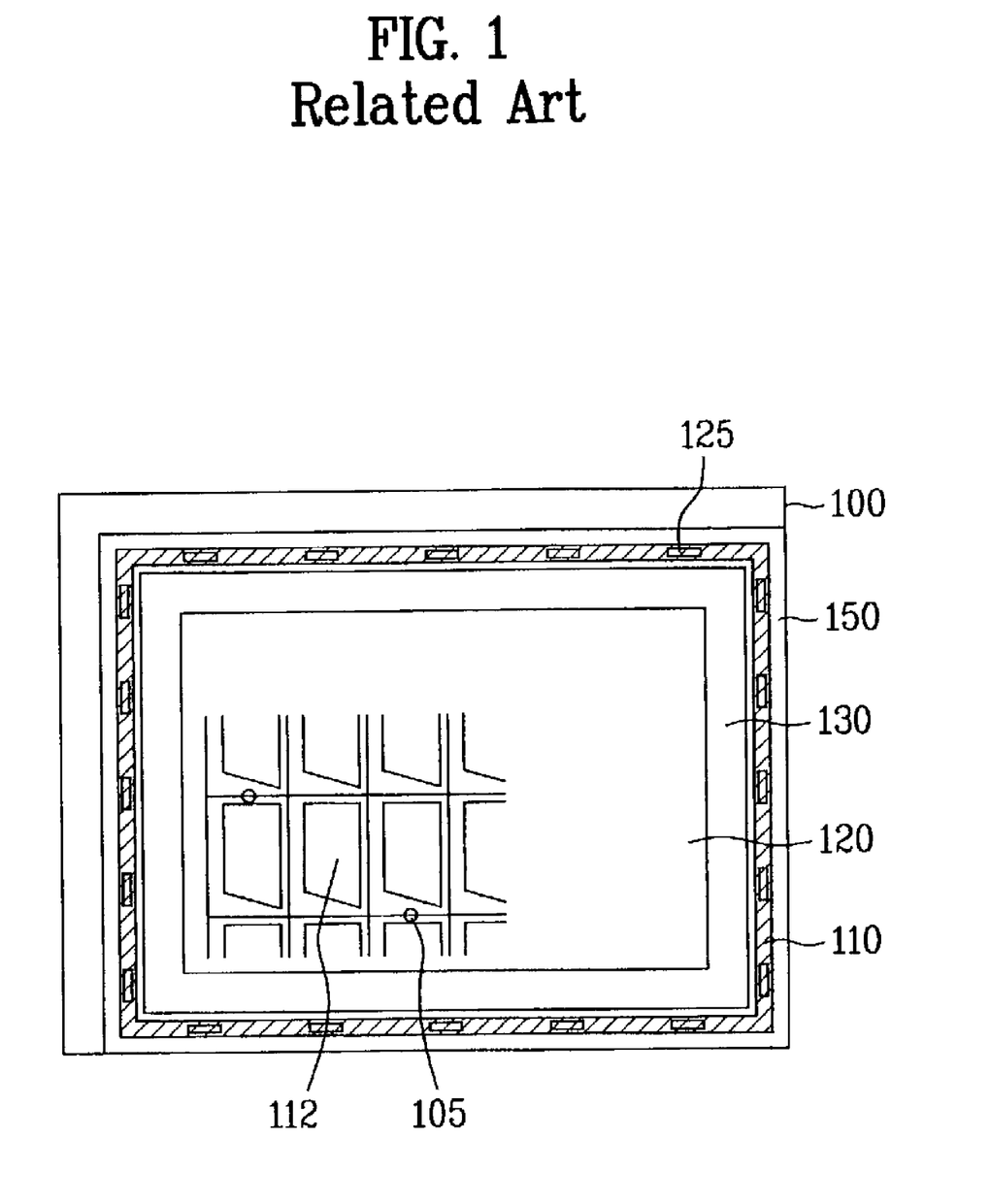
FIG. 1 illustrates a plane view of a liquid crystal display device fabricated by using a related art liquid crystal dispensing method.

A related art liquid crystal display device and a method of fabricating the same will be explained with reference to the accompanying drawings. FIG. 1 illustrates a plane view of a liquid crystal display device according to a related art liquid crystal dispensing method. FIGS. 2A to 2G illustrate fabrication process of a liquid crystal display device according to the related art liquid crystal dispensing method.

Referring to FIG. 1, a plurality of gate lines and data lines are formed on a first substrate 100 to cross each other and define a plurality of pixel regions 112. A plurality of thin film transistors (TFTs) are formed at each crossing point of the plurality of gate and data lines, and a plurality of pixel electrodes are formed in the pixel regions for being electrically connected to drain electrodes of the TFTs. Thereafter, silver (Ag) dots are formed at predetermined portions of the first substrate 100 for applying a voltage to a common electrode of a second substrate, and liquid crystal is dispensed on an active region.

Then, a black matrix layer, a color filter layer, and the common electrode are formed on the second substrate 150, and column spacers 150 are formed on portions of the second substrate corresponding to the gate and data lines of the first substrate 100 except for the pixel regions 112 of the first substrate 100. Upon formation of the column spacers, a photo-hardening sealant 110 including a glass fiber 125 is formed on the second substrate 150. The first and second substrates 100 and 150 are bonded to each other, and then UV-ray is irradiated to the photo-hardening sealant 110 including the glass fiber, thereby hardening the photo-hardening sealant 110. Furthermore, the column spacers 105 are formed within the active region 120 to maintain a cell gap on the entire panel of the liquid crystal display device. The cell gap is uniformly maintained at the circumferential region of the active region 120 by the thickness of the glass fiber 125 included in the photo-hardening sealant 110.

In this case, the photo-hardening sealant 110 including the glass fiber 125 is formed as follows. First, the photo-hardening sealant 110 is mixed with the glass fiber 125 at a ratio of 100 to 1 in weight for about ten minutes. A seal mixture of the photo-hardening sealant and the glass fiber is stirred to remove bubbles for two hours under a vacuum condition. The seal mixture without any bubbles is hermetically maintained in a cylinder at a temperature below 0 □. Then, the seal mixture and cylinder are maintained at the ambient temperature for about three hours or more. When the glass fiber 125 is mixed with the photo-hardening sealant 110 having high viscosity, gas bubbles are generated. Even though the gas bubbles are removed under a vacuum condition in a bubble remover, the gas bubbles are not completely removed since the high viscosity sealant is used to form the seal mixture. Accordingly, the photo-hardening sealant is unevenly formed, and spots appear on the panel due to the gas bubbles. Also, external moisture may penetrate into the liquid crystal display device through the sealant due to an out-gassing of the gas bubbles inside the sealant, thereby degrading a picture quality.

A method of fabricating a related art liquid crystal display device will be explained in detail. FIGS. 2A to 2G illustrate fabrication process of a liquid crystal display device according to a related art liquid crystal dispensing method. In FIGS. 2A to 2G, a plurality of liquid crystal display panel regions 200 are formed on one substrate, and then are cut into a plurality of unit panels.

Figure 2A:
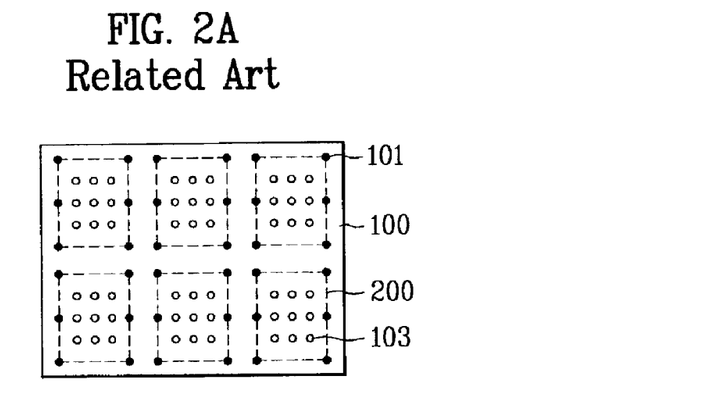
FIGS. 2A to 2G illustrate a fabrication process of a liquid crystal display device according to the related art liquid crystal dispensing method.

Referring to FIG. 2A, a thin film transistor (TFT) array including gate and data lines (not shown) is formed at each liquid crystal display panel region 200 on a first substrate 100, and silver (Ag) dots are formed with a constant distance in the peripheral region of each liquid crystal display panel region 200 on the first substrate 100. Then, liquid crystal 103 is dispensed on each liquid crystal display panel region 200. The silver (Ag) dots are formed for applying a voltage to a common electrode formed on a second substrate 150.

Figure 2B:
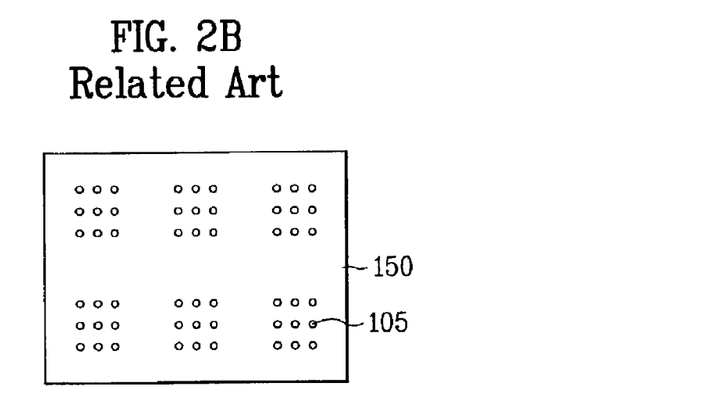

As shown in FIG. 2B, column spacers 105 are formed on a black matrix layer (not shown) of the second substrate 150, on which a color filter array is formed at each liquid crystal display panel region.

Figure 2C:
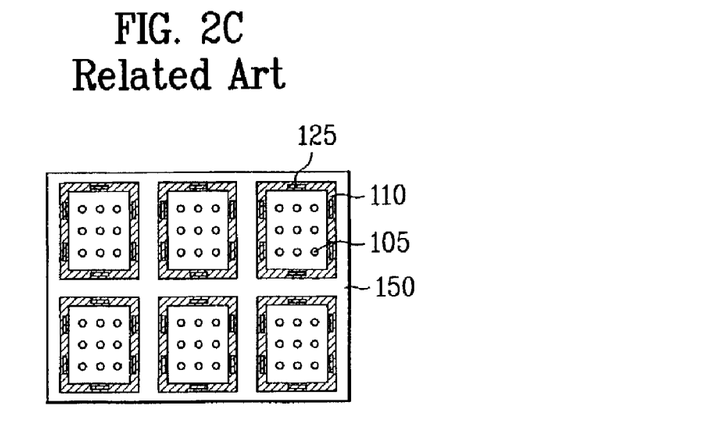

Then, a photo-hardening sealant 110 including a glass fiber 125 is formed in the peripheral region of each liquid crystal display panel region on the second substrate 150, as shown in FIG. 2C.

Figure 2D:
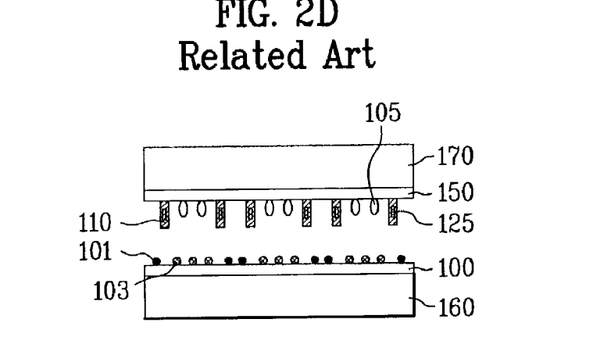

Referring to FIG. 2D, the silver (Ag) dots 101 and the liquid crystals 103 are formed on the first substrate 100, and the column spacer 105 and the sealant 110 are formed on the second substrate 150. The first and second substrates 100 and 150 are loaded to a bonding apparatus being controlled to be under a vacuum condition. The surface of the second substrate 150, on which the sealant 110 is deposited, faces down, and then is fixed to an upper stage 170 that moves along the Z-axis direction (i.e., vertical direction). Also, the first substrate 100 is fixed to a lower stage 160 that moves along the XY-axis direction (i.e., horizontal direction). At this time, the silver (Ag) dots 101 are disposed outside the photo-hardening sealant 110.

Figure 2E:
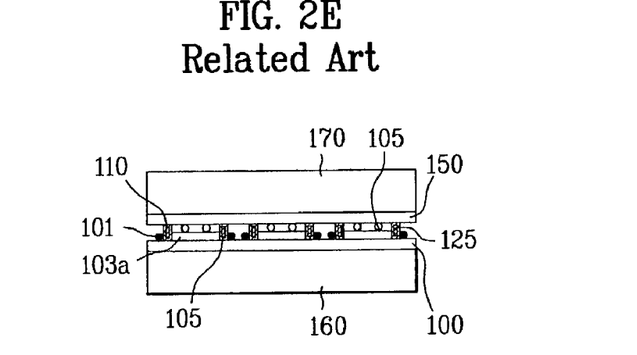

As shown in FIG. 2E, the second substrate 150 fixed to the upper stage 170 and the first substrate fixed to the lower stage 160 are aligned, and a chamber of the bonding apparatus becomes in a vacuum condition. The upper stage 170 moves down to bond the first and second substrates 100 and 150 to each other.

Figure 2F:
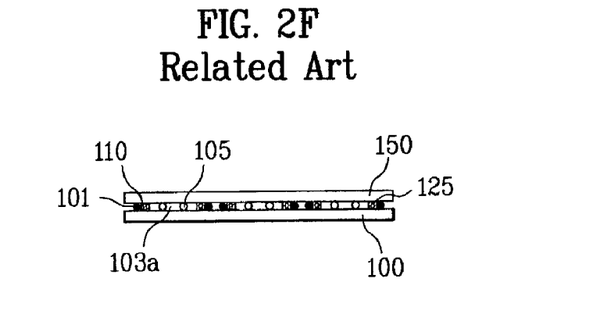

Referring to FIG. 2F, gas or dry air is provided to the chamber of the bonding apparatus under a vacuum condition so as to equalize a pressure of the chamber to the ambient pressure. Accordingly, the first and second substrates bonded by the sealant 110 are maintained under a vacuum condition, and the circumferential region of the substrates is under the ambient pressure. Thus, the first and second substrates are pressed to each other caused by a pressure difference between the inside pressure of the substrates and the ambient pressure. Simultaneously, the liquid crystals 103 spread out on the entire panel between the first and second substrates, thereby forming a liquid crystal layer 103a.

Figure 2G:
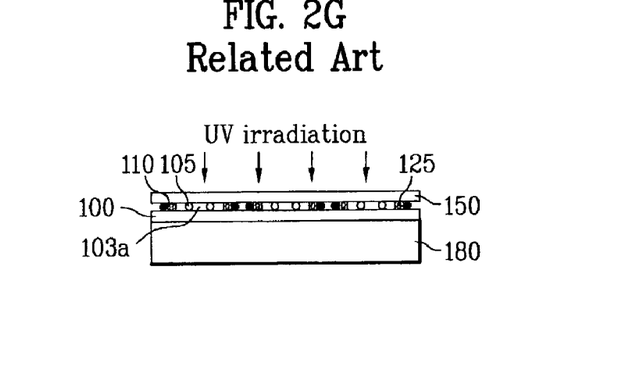

Thereafter, the first and second substrates 100 and 150 bonded to each other are loaded on a quartz stage 180, shown in FIG. 2G. The UV-ray is irradiated to the bonded substrates from the bottom of the first substrate 100, thereby hardening the photo-hardening sealant 110 including the glass fiber 125 with the UV-ray.

However, the related art liquid crystal display device according to the liquid crystal dispensing method and the method of fabricating the same have the following disadvantages.

The photo-hardening sealant is mixed with the glass fiber, so that the gas bubbles are generated. Accordingly, spots appear on the panel due to the remaining gas bubbles after bonding the first and second substrates to each other. Also, it is difficult to maintain a uniform cell gap between the substrates in that the photo-hardening sealant is unevenly formed.

Furthermore, the external moisture may penetrate into the liquid crystal layer through the sealant due to an out-gassing of the gas bubbles inside the sealant, thereby degrading a picture quality.

SUMMARY OF THE INVENTION

Accordingly, the present invention is directed to a liquid crystal display device and a method of fabricating the same that substantially obviate one or more of problems due to limitations and disadvantages of the related art.

Another object of the present invention is to provide a liquid crystal display device and a method of fabricating the same, in which a sealant is formed at the sealant formation area of the substrate after forming column spacer on the sealant, so that spots do not appear on the liquid crystal display panel region and external moisture does not penetrate into the liquid crystal layer through the sealant.

Additional features and advantages of the invention will be set forth in the description which follows and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a liquid crystal display device includes first and second substrates facing into each other, a sealant outside a liquid crystal display panel region between the first and second substrates, a first column spacer surrounded by the sealant, and a liquid crystal layer between the first and second substrates.

In another aspect of the present invention, a method of fabricating a liquid crystal display device includes forming a liquid crystal on a liquid crystal display panel region of a first substrate, forming a first column spacer outside the liquid crystal display panel region on a second substrate, forming a sealant in the peripheral region of the liquid crystal display panel region to surround the first column spacer, and bonding the first and second substrates to each other.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention.

In the drawings.

DETAILED DESCRIPTION OF THE ILLUSTRATED EMBODIMENTS

Reference will now be made in detail to the illustrated embodiments of the present invention, examples of which are illustrated in the accompanying drawings. Wherever possible, the same reference numbers will be used throughout the drawings to refer to the same or like parts.

Figure 3A:
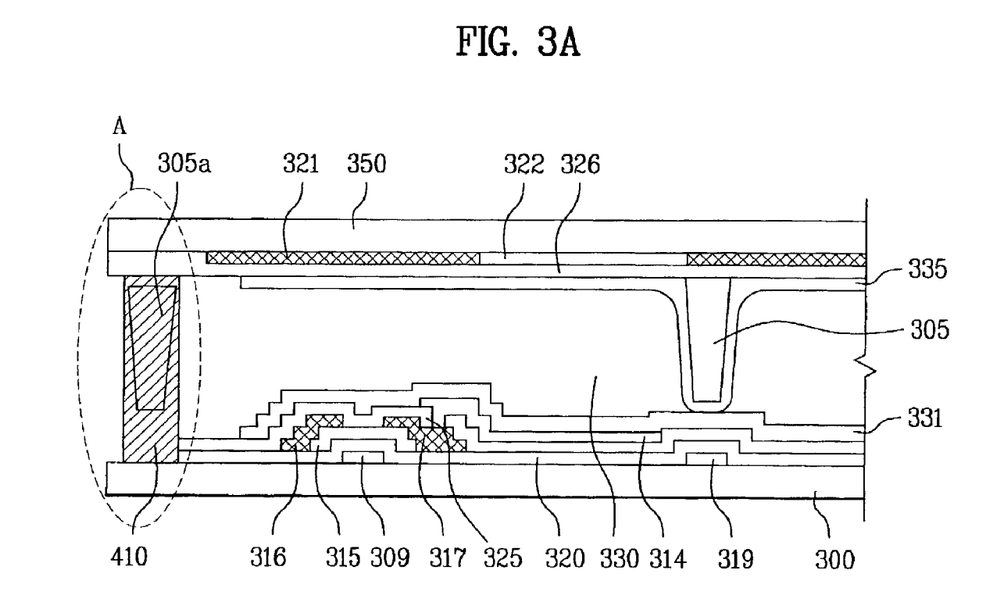
FIG. 3A illustrates a cross-sectional view of a liquid crystal display device according to the present invention.
Figure 3B:
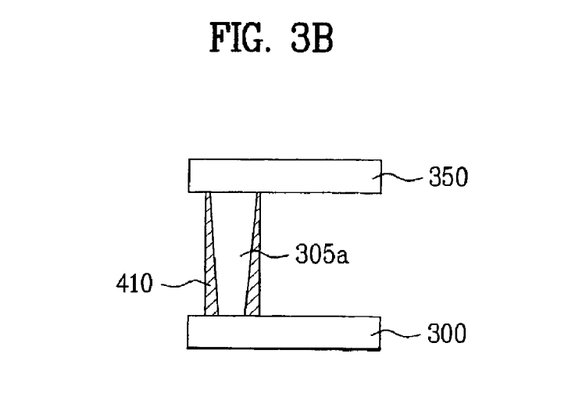
FIG. 3B illustrates an enlarged view of a sealant in FIG. 3A.

FIG. 3A illustrates a cross-sectional view of a liquid crystal display device according to the present invention. FIG. 3B illustrates an enlarged view of a sealant in FIG. 3A.

Referring to FIG. 3A, a metal layer is deposited on a first substrate 300, and a gate line 319 is formed by a photolithography. Simultaneously, a gate electrode 309 is formed at a portion of the first substrate 300 beneath a thin film transistor, and a gate insulating layer 320 is formed on the entire surface of the first substrate 300 including the gate electrode 309. A semiconductor layer 315 as an active layer is formed on the gate insulating layer 320, and a data line (not shown) including source and drain electrodes 316 and 317 is formed on the semiconductor layer 315. At this time, the source and drain electrodes 316 and 317 are formed on the semiconductor layer 315 at both sides of the gate electrode 309.

Thereafter, a passivation layer 325 is formed on the entire surface of the first substrate 300 including the source and drain electrodes 316 and 317. A contact hole is formed on the drain electrode 317, and a pixel electrode 314 is formed on the passivation layer 325 of a pixel region for an electrical connection to the drain electrode 317. A first alignment layer 331 is formed on the entire surface of the first substrate including the pixel electrode 314.

Subsequently, a plurality of black matrix layers 321 are formed on a second substrate 350 so as to prevent a light leakage except for the pixel regions, and R, G, and B color filter layers 322 are formed at the pixel regions between the black matrix layers 321. An overcoat layer may be formed on the color filter layer 322.

Next, a common electrode 326 is formed on the entire surface of the second substrate including the color filter layer 322, and column spacers 305 and 305a are formed on the second substrate 350. The column spacers 305 and 305a are formed at sealant forming regions in the next process step as well as on liquid crystal display panel regions.

A photo-hardening sealant 410 is deposited on the column spacer 305a disposed at the peripheral region which is outside of the liquid crystal display panel region. Subsequently, liquid crystals are dispensed on the first substrate 300 having an alignment layer. The surface of the second substrate 350, on which the sealant 410 is deposited, faces down, and then is positioned on the first substrate 300 so as to bond the second substrate to the first substrate. At this time, the photo-hardening sealant 410 does not include a glass fiber. A mixture of a thermo-hardening sealant and a photo-hardening sealant or a thermo-hardening sealant may be used instead of the photo-hardening sealant. In addition, the column spacer 305a may be formed on a sealant in dotted patterns.

The color filter layer 322 and/or an overcoat layer may be additionally formed at predetermined portions of the second substrate 350 on which the photo-hardening sealant 410 is deposited, thereby maintaining a uniform cell gap due to the column spacer 305a. Meanwhile, it is not required to additionally form a color filter layer and an overcoat layer on the first substrate 300 in that a step difference is slight between the patterns formed on the first substrate 300.

The column spacers 305 and 305a are simultaneously formed within the liquid crystal display panel region and the peripheral region of the liquid crystal display panel region, thereby simplifying a fabrication process. Also, an organic resin material may be deposited on the second substrate in order to form the column spacer 305 and 305a by exposing and developing process. That is, the photo-hardening sealant is not mixed with a glass fiber, thereby preventing generation of gas bubbles. When the photo-hardening sealant 410 is deposited on the column spacer 305a disposed in the peripheral region of the liquid crystal display panel region, it maintains the uniform cell gap since gas bubbles are not generated. Accordingly, the uniform cell gap is maintained between the substrates since the photo-hardening sealant 410 is evenly deposited, spots do not appear, and the external moisture does not penetrate into the liquid crystal layer.

FIG. 3B illustrates an enlarged view of "A" portion in FIG. 3A. Referring to FIG. 3B, the column spacer 305a is formed to be surrounded by the photo-hardening sealant 410 so as to maintain a uniform cell gap.

Figure 4:
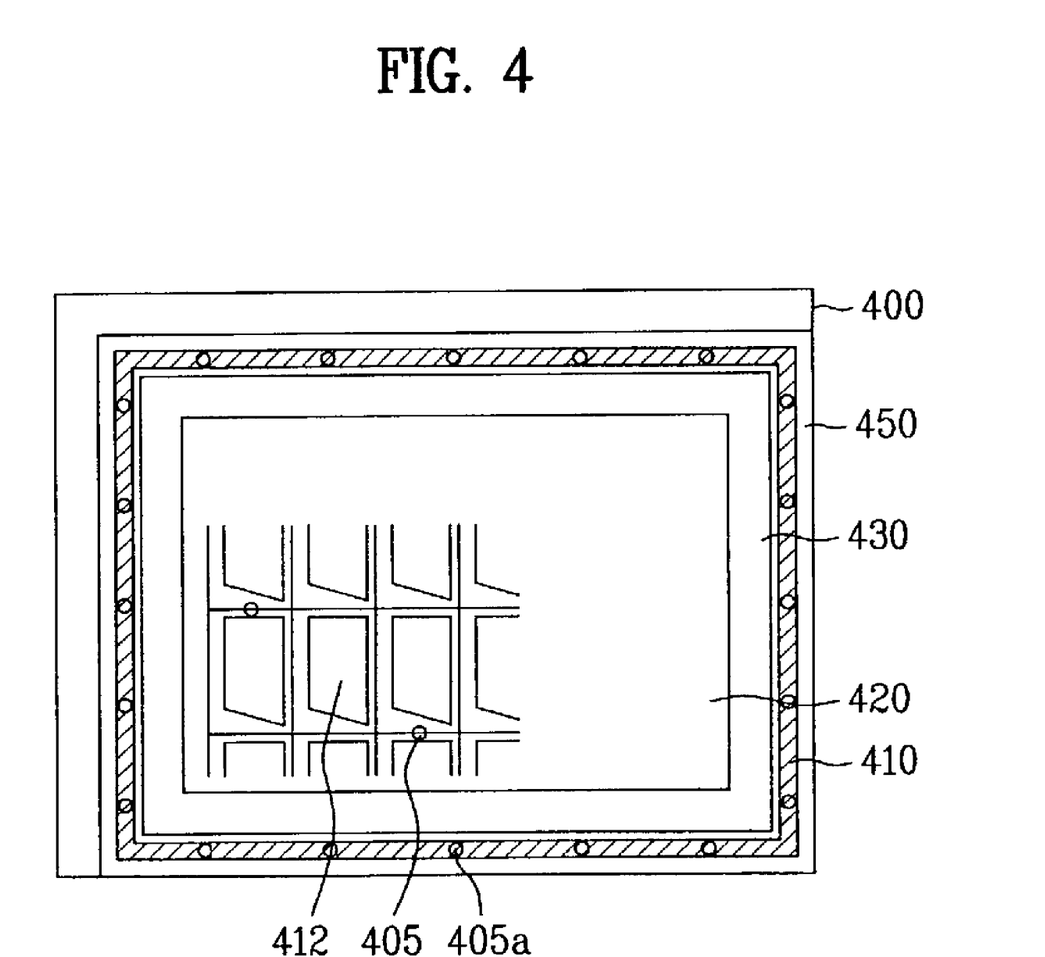
FIG. 4 illustrates a plane view of a liquid crystal display device fabricated by using a liquid crystal dispensing method of the present invention.

FIG. 4 illustrates a plane view of a liquid crystal display device in accordance with a liquid crystal dispensing method of the present invention. Referring to FIG. 4, liquid crystals are dispensed on a first substrate 400 including a thin film transistor array and a plurality of silver (Ag) dots (not shown). Then, column spacers 405 and 405a are formed on a liquid crystal display panel region and a sealant of a second substrate 450 having a color filter array. The column spacers 405 and 405a are made of an organic resin material, and are patterned by exposing and developing processes. After forming the column spacers 405 and 405a, a photo-hardening sealant 410 is deposited at the peripheral region of the liquid crystal display panel region, thereby bonding the substrates to each other. Then, the sealant is hardened by irradiating UV-ray to the bonded liquid crystal display panel regions. The photo-hardening sealant may be wider or narrower than a black matrix layer 430 in width.

In this state, the liquid crystal display panel region is divided into an active region 420 and a dummy region including the black matrix layer 430. The column spacer 405 is formed so as to maintain a cell gap on the entire liquid crystal display panel region, which is formed having a width between about 5 and 30 μm. Also, the column spacer 405 may be made of either an organic resin material or one of photosensitive materials. The column spacer 405a is formed on the sealant in the peripheral region of the liquid crystal display panel region so as to maintain a uniform cell gap to display a high quality image.

FIGS. 5A to 5G illustrate fabrication process steps of a liquid crystal display device in accordance with a liquid crystal dispensing method of the present invention.

Figure 5A:
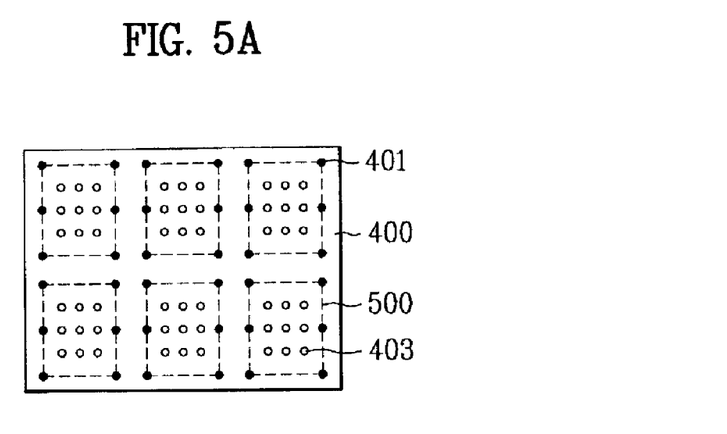
FIGS. 5A to 5G illustrate a fabrication process of a liquid crystal display device in accordance with a liquid crystal dispensing method of the present invention.

As shown in FIG. 5A, a plurality of liquid crystal display panel regions 500 are arranged on first and second substrates. A thin film transistor (TFT) array including a plurality of gate lines, a plurality of data lines, and a plurality of pixel electrodes, is formed in each liquid crystal display panel region 500 on the first substrate 400. Then, a plurality of silver (Ag) dots 401 are formed to be spaced apart with a constant distance in the peripheral region of the liquid crystal display panel region, and liquid crystals 403 are dispensed inside the liquid crystal display panel region 500.

Figure 5B:
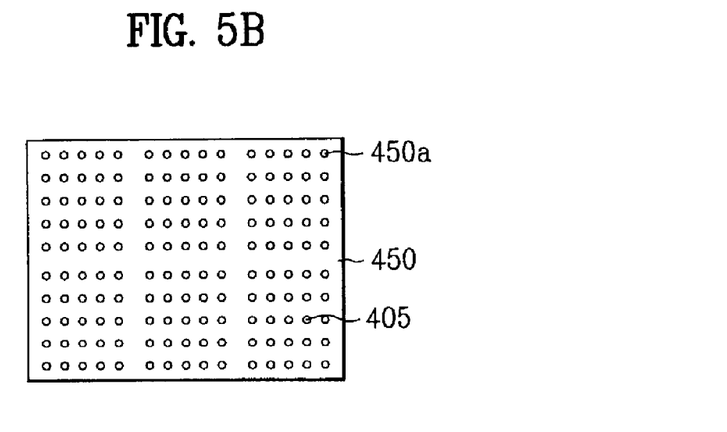
Figure 5C:
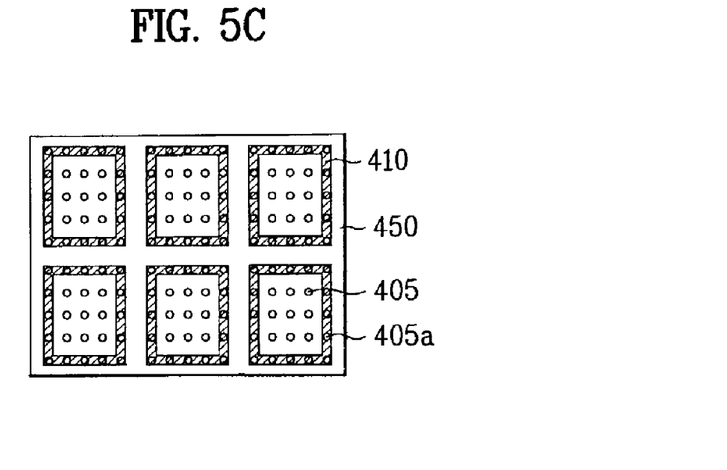

Referring to FIG. 5B, the color filter array is formed on each liquid crystal display panel region of the second substrate 450, and the column spacers 405 and 405a are formed inside the liquid crystal display panel region and on a sealant forming portions. At this time, the column spacers are formed on the black matrix layer. After that, a photo-hardening sealant is deposited in the peripheral region of the liquid crystal display panel region on the second substrate 450, as shown in FIG. 5C. The photo-hardening sealant 410 is formed on the column spacer 405a.

Figure 5D:
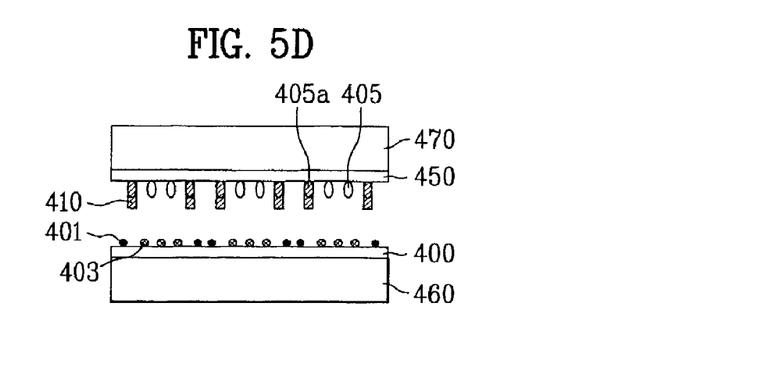
Figure 5E:
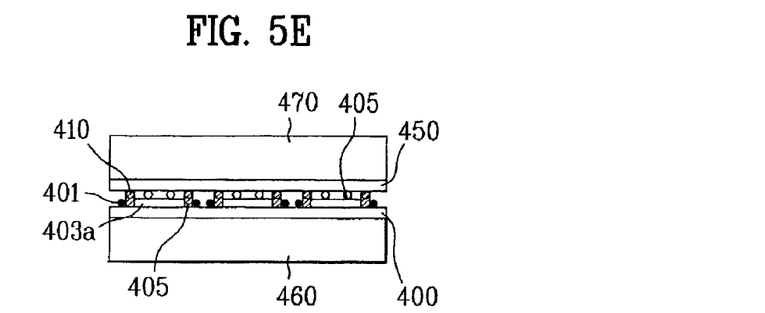

Referring to FIG. 5D, the first and second substrates 400 and 450 are loaded to the chamber of a bonding apparatus to be in a vacuum condition. The surface of the second substrates 450, on which the sealant is formed, faces down, and then is fixed to an upper stage 470 of the bonding apparatus that moves along the Z-axis direction (i.e., vertical direction). The surface of the first substrate 400, on which the liquid crystal is dispensed, is fixed to a lower stage 460 that moves along the XY-axis direction (i.e., horizontal direction). Then, the lower stage 460 moves along the X-Y axis direction so as to align the second substrate 450 fixed to the upper stage 470 and the first substrate 400 fixed to the lower stage 460. When the chamber of the bonding apparatus is under a vacuum condition, the upper stage 470 moves down so as to bond the first and second substrates to each other. In this state, the first and second substrates are bonded to each other to have a cell gap (first gap).

Figure 5F:
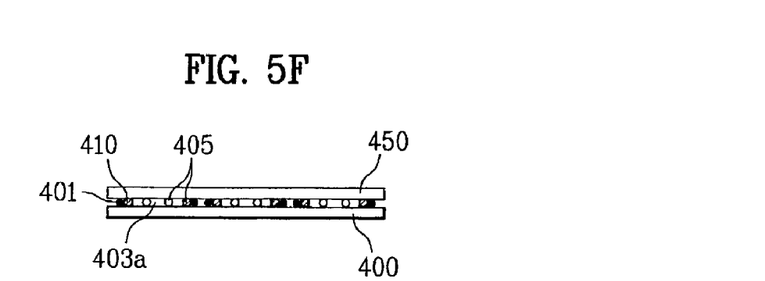

Referring to FIG. 5F, a nitrogen gas ($N_2$) or air is provided to the chamber of the bonding apparatus so as to equalize the pressure of the chamber with the ambient pressure. Accordingly, the substrates bonded with the first gap are under a vacuum condition, and the chamber is maintained as the ambient pressure. The substrates are pressed by a pressure difference between the ambient pressure and the pressure maintained in the substrates, so that the substrates are pressed to have a second gap. Therefore, a liquid crystal layer 403a having a constant thickness is formed between the substrates.

Figure 5G:
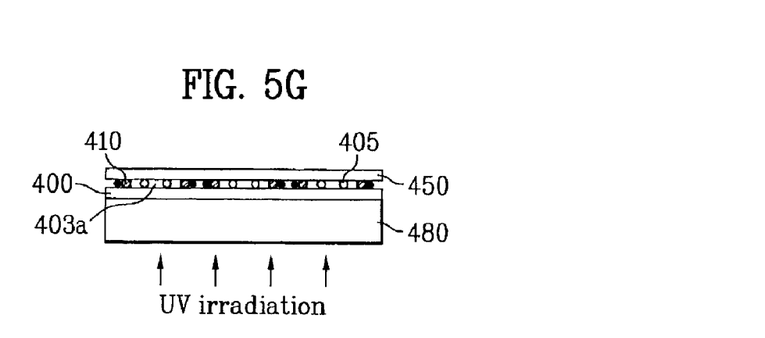

Next, as shown in FIG. 5G, the pressed substrates are loaded on a transparent quartz stage 480, and UV-ray is irradiated to the sealant only from the bottom of the first substrate 400, thereby hardening the photo-hardening sealant 410.

The embodiment of the present invention may be applied to any kind of different modes, such as twisted nematic (TN) mode, vertical alignment (VA) mode, in-plane switching (IPS) mode, ferroelectric liquid crystal (FLC) mode, optically compensated birefringence (OCB) mode, and reflective mode.

As mentioned above, the liquid crystal display device and the method of fabricating the same according to the present invention have the following advantages.

The present invention does not require to mix the photo-hardening sealant with a glass fiber, so that gas bubbles are not generated. Accordingly, spots do not appear on the panel after bonding the first and second substrates to each other. Also, the cell gap can be uniformly maintained with the column spacers, and the photo-hardening sealant can be evenly formed on the substrate.

Furthermore, the external moisture does not penetrate into the liquid crystal layer through the sealant, thereby improving a picture quality.

It will be apparent to those skilled in the art that various modifications and variations can be made in the liquid crystal display device and the method of fabricating the same of the present invention without departing from the spirit or scope of the inventions. Thus, it is intended that the present invention covers the modifications and variations of this invention provided they come within the scope of the appended claims and their equivalents.

What is claimed is:

1. A liquid crystal display device, comprising:
a first substrate including a thin film transistor array;
a second substrate facing with the first substrate, wherein the second substrate has a color filter array including a black matrix layer, a color filter layer and a common electrode;
a sealant outside a liquid crystal display panel region between the first and second substrates, the sealant being free of a glass fiber;
a first column spacer completely embedded in the sealant, wherein the first column spacer is formed on the common electrode on the second substrate; and
a liquid crystal layer between the first and second substrates;
wherein the sealant completely surrounds the perimeter of the liquid crystal display panel region.

2. The device of claim 1, wherein the sealant is a photo-hardening sealant.

3. The device of claim 1, wherein the sealant is a mixture of a thermo-hardening sealant and a photo-hardening sealant.

4. The device of claim 1, further comprising an alignment layer on at least one of the first and second substrates.

5. The device of claim 1, further comprising a second column spacer in the liquid crystal display panel region.

6. The device of claim 5, wherein the first and second column spacers are formed at the same time.

7. The device of claim 5, wherein the first and second column spacers are formed of the same material.

8. The device of claim 1, wherein the first substrate has a thin film transistor (TFT) array including a plurality of gate lines, a plurality of data lines, a plurality of thin film transistors, and a plurality of pixel electrodes.

* * * * *